United States Patent
Zhang et al.

(10) Patent No.: US 7,177,416 B1
(45) Date of Patent: Feb. 13, 2007

(54) CHANNEL CONTROL AND POST FILTER FOR ACOUSTIC ECHO CANCELLATION

(75) Inventors: Ming Zhang, Cupertino, CA (US); KuoYu Lin, San Jose, CA (US)

(73) Assignee: ForteMedia, Inc., Cupertino, CA (US)

( * ) Notice: Subject to any disclaimer, the term of this patent is extended or adjusted under 35 U.S.C. 154(b) by 109 days.

(21) Appl. No.: 10/193,689

(22) Filed: Jul. 10, 2002

Related U.S. Application Data (60) Provisional application No. 60/375,923, filed on Apr. 27, 2002.

(51) Int. Cl.
*H04M 9/08* (2006.01)

(52) U.S. Cl. .............................. 379/387.01; 379/406.05

(58) Field of Classification Search ................ 379/406; 370/288–292
See application file for complete search history.

(56) References Cited

U.S. PATENT DOCUMENTS

| | | | | |
|---|---|---|---|---|
| 4,965,822 A | * | 10/1990 | Williams | 379/406.08 |
| 5,263,020 A | * | 11/1993 | Yatsuzuka et al. | 370/289 |
| 5,721,730 A | * | 2/1998 | Genter | 370/288 |
| 6,147,979 A | * | 11/2000 | Michel et al. | 370/292 |
| 6,658,107 B1 | * | 12/2003 | Sorqvist et al. | 379/406.05 |
| 6,678,376 B1 | * | 1/2004 | Takahashi et al. | 379/406.01 |

* cited by examiner

*Primary Examiner*—Sinh Tran
*Assistant Examiner*—Walter F Briney, III
(74) *Attorney, Agent, or Firm*—Dinh & Associates (57) ABSTRACT

An acoustic echo canceller comprising an adaptive filter, a post filter, and an adjustable filter. The adaptive filter receives a reference signal and a near-end signal, cancels a portion of the echo in the near-end signal using the reference signal, and provides an intermediate signal having remaining echo not canceled by the adaptive filter. The post filter calculates the cross-correlation between the near-end signal and intermediate signal, and provides a set of coefficients based on a variable suppression parameter. The adjustable filter processes the intermediate signal based on the coefficients and provides an output signal having at least a portion of the remaining echo removed. The acoustic echo canceller may further comprise a channel control unit that provides control signals, an adjustable amplifier, a noise estimator that estimates the noise in the intermediate signal, and a noise reinsertion unit that reinserts a version of the estimated noise back into the output signal.

26 Claims, 7 Drawing Sheets

CHANNEL CONTROL AND POST FILTER FOR ACOUSTIC ECHO CANCELLATION

CROSS-REFERENCES TO RELATED APPLICATIONS

This application claims the benefit of provisional U.S. Application Ser. No. 60/375,923, entitled "Channel Control and Post Filter for Acoustic Echo Cancellation," filed Apr. 7, 2002, which is incorporated herein by reference in its entirety for all purposes.

This application is further related to U.S. application Serial No., entitled "Acoustic Echo Cancellation with Adaptive Step Size and Stability Control," filed on the same day herewith and incorporated herein by reference in its entirety for all purposes.

BACKGROUND OF THE INVENTION

The present invention relates generally to signal processing, and more specifically to techniques for canceling acoustic echo using channel control and post filtering.

Full-duplex hands-free communication systems are used for many applications, such as speakerphone, hands-free car kit, teleconferencing system, cellular phone, and so on. For each of these systems, a microphone picks up an acoustic signal emitted by a speaker and the reflections from the borders of an enclosure, such as a room or a car. In the case of a telecommunication system, users are often annoyed by listening to their own voice, which is delayed by the path of the system. This acoustic disturbance is referred to as echo.

Echo cancellation is often required in many communication systems to eliminate echo as well as remove howling effect. For example, echo cancellation is typically used in a hands-free full-duplex environment, such as a vehicle or a room, where the speaker and microphone may be located some distance away from a user. Conventionally, echo cancellation is achieved by a circuit that employs an adaptive filter. This adaptive filter may implement a least mean square (LMS) algorithm or a normalized least mean square (NLMS) algorithm. The adaptive filter performs echo cancellation based on a reference signal, which may be a line input from a communication or telematics device such as a cellular phone or some other device. The adaptive filter is typically able to remove the portion of the echo that is correlated to the reference signal.

However, conventional echo cancellation techniques are not able to remove certain portion of the echo. For example, non-linearity of the circuitry in the communication systems (e.g., the speaker, analog-to-digital (A/D) converter, digital-to-analog (D/A) converter, and so on) generates echo that is not correlated to the reference signal. This type of echo cannot be canceled by conventional echo cancellation techniques which only employ an adaptive filter. Moreover, user movement and volume change can cause the echo path to vary. This results in varying echo that typically cannot be canceled very well, particularly if the echo path changes faster than the convergence rate of the adaptive filter. For these and other reasons, a portion of the echo often remains after the conventional echo cancellation with the adaptive filter.

Non-linear echo cancellation techniques may be used to attempt to cancel the remaining echo. However, some conventional non-linear echo cancellation techniques, such as a center clipper, can cause voice distortion by cutting off low power voice. The techniques also cannot handle high volume echo. Conventional center clippers are described, for example, in U.S. Pat. Nos. 4,031,338, 4,679,230 and 5,475,731, and European Patent Nos. EP-0164159-A1 and EP-0164159-B1. Other conventional non-linear echo cancellation techniques, such as conventional post filters, also cannot deal with very strong echo and serious non-linearity.

As can be seen, techniques that can effectively cancel acoustic echo in communication systems are highly desirable.

SUMMARY OF THE INVENTION

Techniques are provided herein to cancel acoustic echo using channel control and variable suppression post filtering. These techniques are effective at suppressing remaining echo due to non-linearity and non-convergence, which are not canceled by conventional echo cancellation techniques. The inventive techniques provide good full-duplex and voice quality, which are highly desirable for hands-free full-duplex applications.

A specific embodiment of the invention provides an acoustic echo canceller comprising an adaptive filter, a post filter, and an adjustable filter. The adaptive filter receives a reference signal r(n) and a near-end signal s(n), cancels a portion of the echo in the near-end signal using the reference signal, and provides an intermediate signal e(n) having remaining echo not canceled by the adaptive filter. The post filter calculates the cross-correlation between the intermediate signal and the near-end signal, and provides a set of coefficients for further suppression of echo. The adjustable filter processes the intermediate signal based on the post filter output and provides an output signal y(n) having at least a portion of the remaining echo removed.

The adaptive filter may implement a normalized least mean square (NLMS) algorithm or some other adaptive algorithm. The post filter output may comprise a set of coefficients for the adjustable filter, which may be implemented as a finite impulse response (FIR) filter.

The acoustic echo canceller may further comprise a channel control unit, an adjustable amplifier, a noise estimator, and a noise reinsertion unit. The channel control unit provides a first control for the adjustable amplifier and a second control for the adjustable filter. The adjustable amplifier amplifies an input signal with a particular gain, which is determined based on the first control, to provide an amplified signal from which the near-end signal is derived. In an embodiment, the adjustable filter either filters the intermediate signal based on the coefficients from the post filter if the second control is in a first state or passes the intermediate signal if the second control is in a second state. The noise estimator estimates the noise in the intermediate signal, and the noise reinsertion unit reinserts (or adds) a version of the estimated noise back into the output signal.

Various other aspects, embodiments, and features of the invention are also provided, as described in further detail below.

The foregoing, together with other aspects of this invention, will become more apparent when referring to the following specification, claims, and accompanying drawings.

DESCRIPTION OF THE SPECIFIC EMBODIMENTS

For clarity, various signals and controls for the echo cancellation systems described herein are labeled with either lower case or upper case. Time-variant signals and control are labeled with "(n)", where n denotes sample time. Lower case symbols (e.g., r(n)) are used to denote scalars, and upper case symbols (e.g., H(n)) are used to denote vectors. The operations shown in the figures may thus be scalar operations (if both input operands are denoted with lower case symbols) or vector operations (if at least one input operand is denoted with an upper case symbol).

Figure 1:
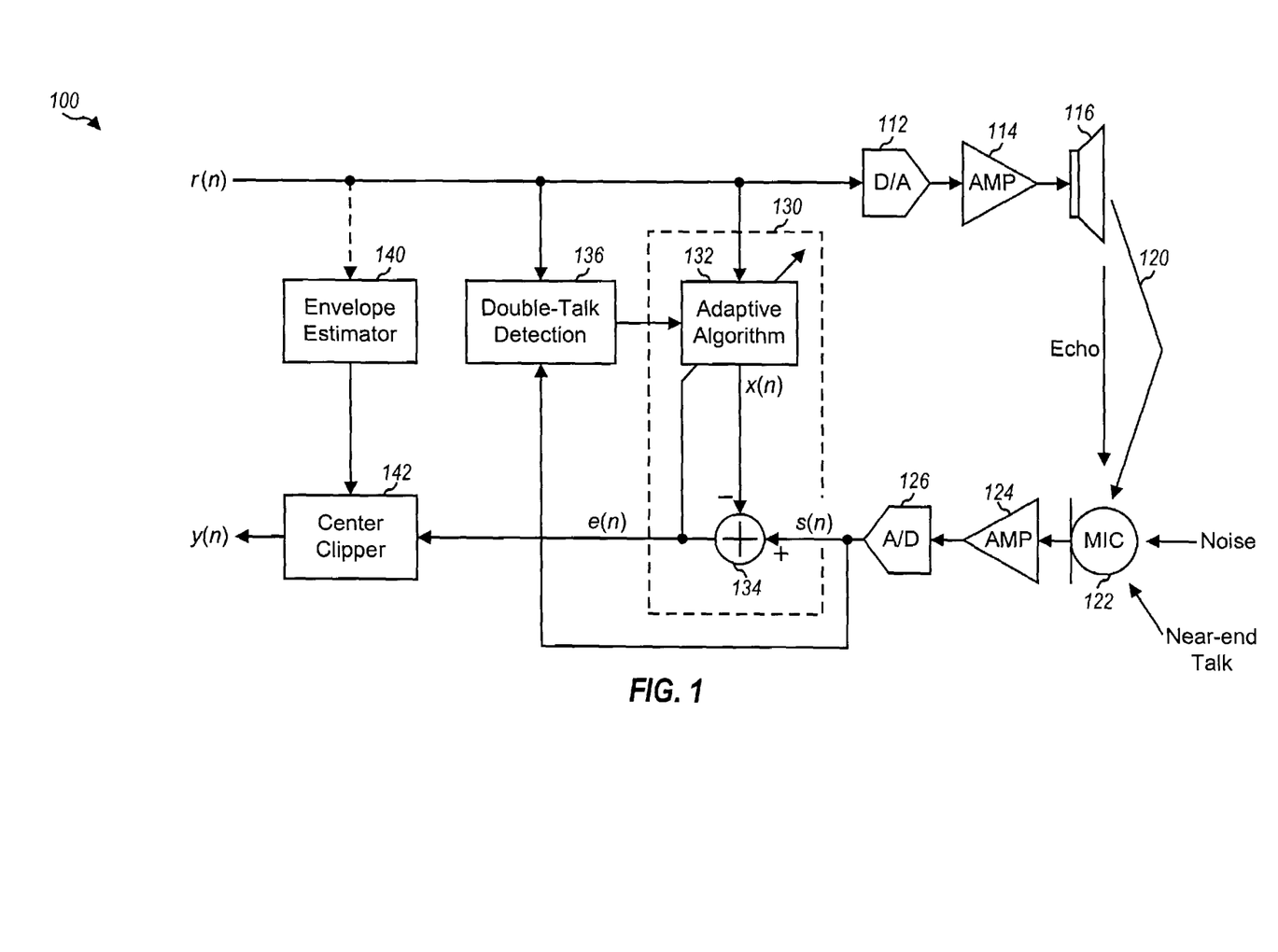
FIG. 1 is a diagram of a conventional echo cancellation system.

FIG. 1 is a diagram of a conventional echo cancellation system 100. In the "output path", a digital signal r(n), which includes audio activity (e.g., speech) from a far-end source, is converted to an analog signal by a digital-to-analog (D/A) converter 112, amplified by a power amplifier 114, and outputted from a speaker 116 to one or more near-end users. A far-end user is one who is located away (or remote) from system 100, and a near-end user is one who is located within the vicinity of system 100. The far-end signal r(n) is also used as a reference signal for an adaptive filter 130.

In the "input path", a microphone 122 receives audio activity from the near-end user (i.e., near-end voice or talk), local ambient noise, and echo from speaker 116 via an echo path 120. The signal from microphone 122 is amplified by an amplifier 124 and further digitized by an analog-to-digital (A/D) converter 126 to provide a digitized near-end signal s(n).

To cancel echo due to the far-end signal r(n) on the near-end signal s(n), a double-talk detection unit 136 receives and processes the far-end signal and the near-end signal to determine whether or not double-talk exists. Near-end talk refers to audio activity (e.g., speech) from a near-end user, far-end talk refers to audio activity from a far-end user, and double-talk refers to a situation when both near-end talk and far-end talk are present. For a teleconference system, the near-end talk may come from users within the room where the teleconference system is installed, and the far-end talk may come from users outside the room. Double-talk detection unit 136 then provides a double-talk control signal to adaptive filter 130. This control signal indicates whether or not double-talk is present and is used to control the updating of the adaptive filter.

Adaptive filter 130 receives the reference signal r(n), the double-talk control signal and the near-end signal s(n), and generates an error signal e(n). Adaptive filter 130 filters the reference signal r(n) based on an adaptive algorithm 132 to provide an estimate of the echo in the near-end signal s(n). The error signal e(n) is then fed back to adaptive algorithm 132 to update the coefficients of the filter. The echo estimate signal x(n) is then subtracted from the near-end signal s(n) by a summer 134 to obtain the error signal e(n).

Adaptive algorithm 132 within adaptive filter 130 is updated when far-end talk is detected and double-talk is not detected, i.e., when the near-end signal s(n) includes mostly the echo from the far-end (or reference) signal r(n). If the echo cancellation by adaptive filter 130 is effective, then the echo estimate signal x(n) is approximately equal to the near-end signal s(n) when double-talk is not present, and the error signal e(n) would be small. However, in a typical implementation, at least a portion of the echo cannot be canceled by adaptive filter 130. In this case, the error signal e(n) would include the remaining echo that has not been canceled. The remaining echo may include components due to various factors such as (1) change of echo path, (2) non-linear effects in amplifier 114, microphone 122, A/D converter 126, speaker 116, and so on when the volume is high, (3) an inadequate number of taps in adaptive algorithm 132 to accurately estimate the echo, and so on.

A center clipper unit 142 processes the error signal e(n) and removes as much of the remaining echo as possible. Center clipper unit 142 is controlled by an envelope estimation unit 140. Center clipper unit 142 outputs an echo-suppressed signal y(n), which is the output of echo cancellation system 100. Center clipper unit 142 is known in the art and not described herein.

The conventional echo cancellation system 100 suffers from some of the shortcomings described above. In particular, system 100 is hard to cancel remaining echo related to echo path change, non-linearity, and so on.

Figure 2:
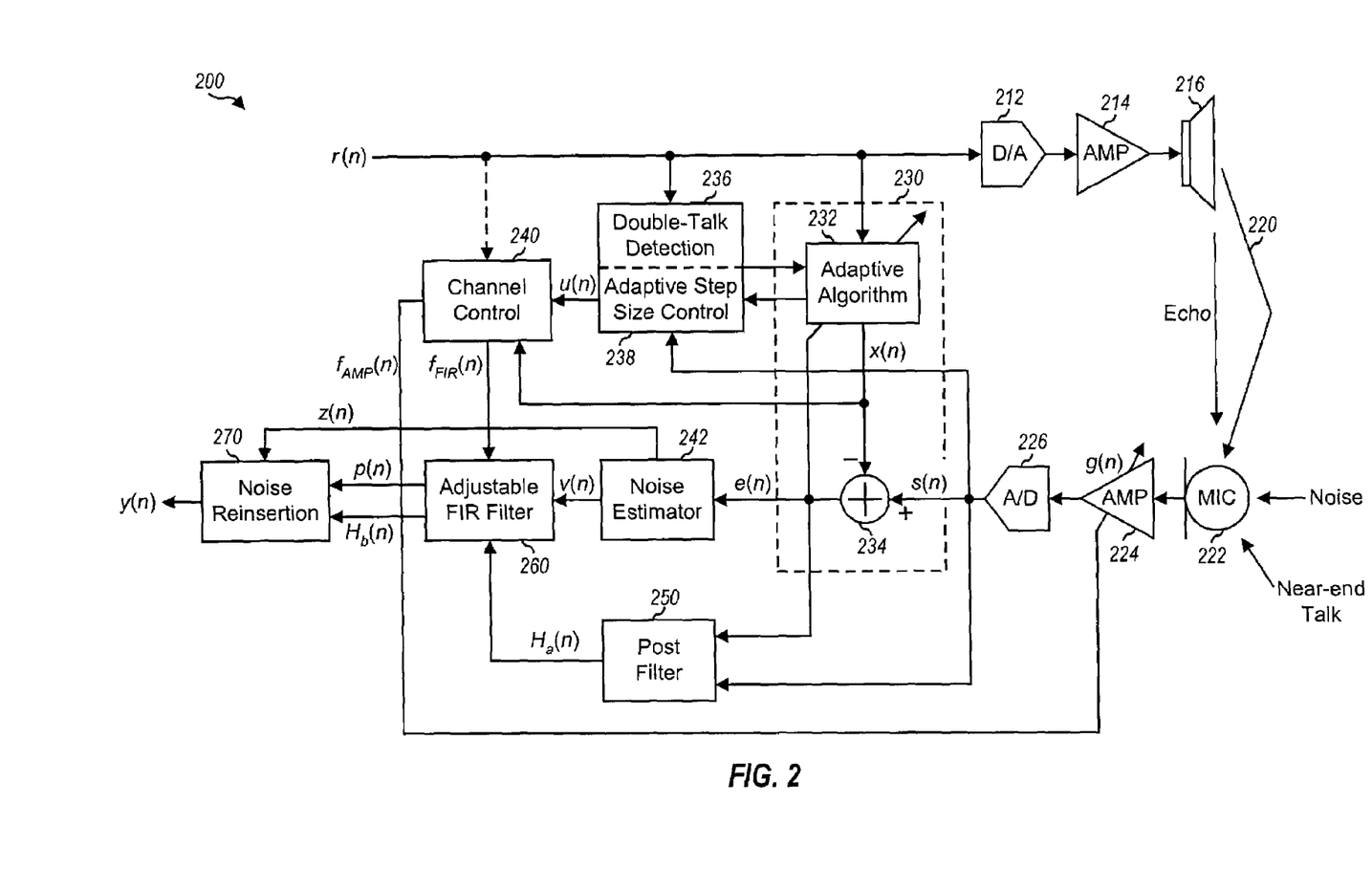
FIG. 2 is a diagram of an echo cancellation system, which is a specific embodiment of the present invention.

FIG. 2 is a diagram of an echo cancellation system 200, which is a specific embodiment of the present invention. In the output path, the far-end signal r(n), which includes audio activity from a far-end source, is converted to an analog signal by a D/A converter 212, amplified by a power amplifier 214, and outputted from a speaker 216 to one or more near-end users. The far-end signal r(n) is also used as the reference signal for an adaptive filter 230.

In the input path, a microphone 222 receives near-end voice, local ambient noise, and echo from speaker 216 via an echo path 220. The signal received by microphone 222 is amplified by an adjustable amplifier 224 with a gain g(n) and further digitized by an A/D converter 226 to provide the near-end signal s(n). In an embodiment, the gain g(n) is adjusted based on a control signal $f_{AMP}(n)$ from a channel control unit 240. In a specific embodiment, the gain g(n) is defined as:

$$g(n) = \begin{cases} g_1, & \text{if } f_{AMP}(n) = 1, \text{ and} \\ g_2, & \text{if } f_{AMP}(n) = 0, \end{cases} \qquad \text{Eq (1)}$$

where $g_1$ is the gain to be used for amplifier 224 if the far-end voice exists, and $g_2$ is the gain to be used for amplifier 224 if the far-end voice is not present. Typically, $g_1$ is less than $g_2$ (i.e., $g_2 > g_1$).

A double-talk detection unit 236 or an adaptive step size control unit 238 may be used to control the updating of adaptive filter 230. Double-talk detection unit 236 processes the far-end signal r(n) and the near-end signal s(n) to determine whether or not double-talk exists. Double-talk detection unit 236 then provides the double-talk control signal, which indicates whether or not double-talk is present. Adaptive step size control unit 238 provides a step size signal u(n) that is used to control the updating of the coefficients by adaptive algorithm 232. A specific design for adaptive step size control unit 238 is described in detail in the aforementioned U.S. patent application Serial No.

Adaptive filter 230 receives the reference signal r(n), the control signal from double-talk/step-size control unit 240 and the near-end signal s(n), and generates the error signal e(n). The error signal e(n) is then fed back to adaptive algorithm 232 to update the coefficients of the filter and the double-talk control signal from double-talk detection unit 236 and/or the step size signal u(n) from adaptive step size control unit 238. Adaptive filter 230 then filters the reference signal r(n) based on an adaptive algorithm 232 to provide an estimate of the echo in the near-end signal s(n). The echo estimate signal x(n) is then subtracted from the near-end signal s(n) by a summer 234 to provide the error signal e(n).

If double-talk detection unit 236 is used to control the updating of adaptive filter 230, then adaptive algorithm 232 is updated when far-end talk is detected and double-talk is not detected, i.e., when the near-end signal s(n) includes mostly the echo from the far-end (or reference) signal r(n). Alternatively, if adaptive step size control unit 238 is used to control the updating of adaptive filter 230, then adaptive algorithm 232 may be updated whenever it is enabled (e.g., at all times, even when double-talk is detected). However, the updating may be performed based on variable step size signal u(n). For example, the step size signal u(n) may be smaller when double-talk exists and may be larger when double-talk is not present.

The error signal e(n) is further provided to a noise estimator 242, which estimates the amount of noise in the error signal e(n) and provides a noise estimate z(n). In one embodiment, the error signal e(n) is further processed by a noise reduction unit (which may be implemented within noise estimator 242) to provide a noise-suppressed signal. In another embodiment, the noise reduction is not performed. In either case, noise estimator 242 provides an output signal v(n). The signal v(n) is equal to the error signal e(n) if noise suppression is not performed by noise estimator 242, and is equal to the noise-suppressed signal if noise suppression is performed.

A post filter 250 receives and processes the near-end signal s(n) and the error signal e(n) to provide a set of coefficients $H_a(n)$ for an adjustable finite impulse response (FIR) filter 260. The coefficients $H_a(n)$ may be derived based on an NLMS algorithm or some other adaptive filter algorithm, as described in further detail below. The coefficients $H_a(n)$ may be used to remove as much of the remaining echo in the signal v(n) as possible.

Adjustable FIR filter 260 receives the signal v(n) from noise estimator 242, the coefficients $H_a(n)$ from post filter 250, and a control signal $f_{FIR}(n)$ from channel control unit 240. As noted above, the signal v(n) includes remaining echo due to various factors (e.g., echo path change, non-linearity, and so on). Adjustable FIR filter 260 attempts to remove as much of this remaining echo as possible to provide improved echo cancellation performance over the conventional echo cancellation system shown in FIG. 1. In an embodiment, adjustable FIR filter 260 initially adjusts the coefficients $H_a(n)$ based on the control signal $f_{FIR}(n)$ to provide adjusted coefficients $H_a'(n)$. Adjustable FIR filter 260 then filters the signal v(n) based on the adjusted coefficients $H_a'(n)$ to provide a signal p(n) having as much of the remaining echo removed as possible.

A noise reinsertion unit 270 receives the signal p(n) from adjustable FIR filter 260, the noise estimate signal z(n) from noise estimator 242, and a set of coefficients $H_b(n)$ from adjustable FIR filter 260. The coefficients $H_b(n)$ are indicative of the amount of noise to reinsert (or add or "paste") back into the signal p(n). In the process of removing as much of the remaining echo as possible, adjustable FIR filter 260 also removes a corresponding amount of noise. For some applications, it is important to maintain the noise level in the output signal approximately constant. This may be necessary, for example, so that changes in the noise level is not mistaken by a subsequent processing unit as changes in the near-end environment or some other factors. Noise reinsertion unit 270 initially derives a noise component z'(n) to be reinserted back into the signal p(n). This noise component z'(n) is derived based on the noise estimate z(n) and the coefficients $H_b(n)$. Noise reinsertion unit 270 then adds the noise component z'(n) to the signal p(n) to provide the echo-suppressed signal y(n).

Channel control unit 240 receives the reference signal r(n), the echo estimate signal x(n), and the step size signal u(n) if adaptive step size control unit 238 is used to control the updating of adaptive filter 230. Channel control unit 240 processes the received signals and provides the control signals $f_{FIR}(n)$ and $f_{AMP}(n)$ for adjustable FIR filter 260 and adjustable amplifier 224, respectively.

Some of the processing units in FIG. 2 are described in further detail below.

Figure 3:
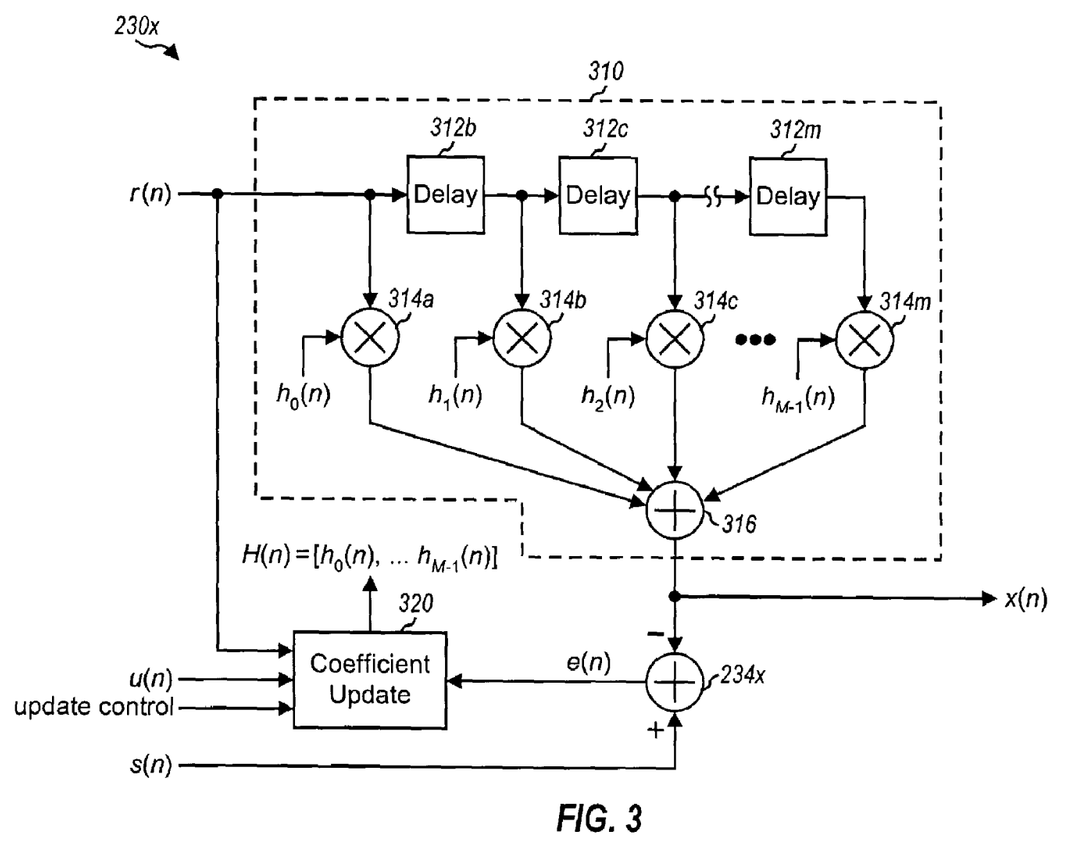
FIG. 3 is a diagram of an adaptive filter.

FIG. 3 is a diagram of an adaptive filter 230x, which is a specific embodiment of adaptive filter 230 in FIG. 2. In this embodiment, adaptive filter 230x includes a FIR filter 310, a summer 234x (which corresponds to summer 234 in FIG. 2), and a coefficient update unit 320. An infinite impulse response (IIR) filter or some other filter architecture may also be used in place of the FIR filter, and is within the scope of the invention.

Within FIR filter 310, the digital samples for the signal r(n) are provided to a number of delay elements 312b through 312m, which are coupled in series. Each delay element 312 provides one sample period of delay. The signal r(n) and the outputs of delay elements 312b through 312m are provided to multipliers 314a through 314m, respectively. Each multiplier 314 also receives a respective coefficient $h_i(n)$ from coefficient update unit 320. Each multiplier 314 scales the received samples with the coefficient and provides the scaled samples to a summer 316. For each sample period n, summer 316 sums the scaled samples from multipliers 314a through 314m and provides a filtered sample for that sample period. The filtered sample for sample period n, x(n), may be computed as:

$$x(n) = \sum_{i=0}^{M-1} h_i^* r(n-i), \qquad \text{Eq (2)}$$

where the symbol (*) denotes a complex conjugate and M is the number of taps of FIR filter 310. The signal x(n) thus comprises a sequence of filtered samples, one filtered sample for each sample period, with each filtered sample being derived as shown in equation (2).

Summer 234x receives and subtracts the signal x(n) from the signal s(n) to provide the error signal e(n).

Coefficient update unit 320 provides the set of M coefficients for FIR filter 310, which is denoted as $H(n)=[h_0(n), h_1(n), \ldots h_{M-1}(n)]$, and further updates these coefficients based on a particular adaptive algorithm. This adaptive algorithm may be implemented with any one of a number of algorithms such as a least mean square (LMS) algorithm, a normalized least mean square (NLMS), a recursive least square (RLS) algorithm, a direct matrix inversion (DMI) algorithm, or some other algorithm. Each of the LMS, NLMS, RLS, and DMI algorithms (directly or indirectly) attempts to minimize the mean square error (MSE) of the error signal e(n).

The NLMS and other algorithms are described in detail by B. Widrow and S. D. Sterns in a book entitled "Adaptive Signal Processing," Prentice-Hall Inc., Englewood Cliffs, N.J., 1986. The LMS, NLMS, RLS, DMI, and other adaptive algorithms are described in further detail by Simon Haykin in a book entitled "Adaptive Filter Theory", 3rd edition, Prentice Hall, 1996. The pertinent sections of these books are incorporated herein by reference.

As shown in FIG. 3, coefficient update unit 320 may also receive the step size signal u(n) from adaptive step size control unit 238 and/or the double-talk control signal from double-talk detection unit 236. These signals may be used to control the manner in which the coefficients are updated. The double-talk control signal may be used to enable the updating of the coefficients. For example, the coefficients may be maintained (i.e., H(n+1)=H(n)) whenever double-talk is detected.

Figure 4A:
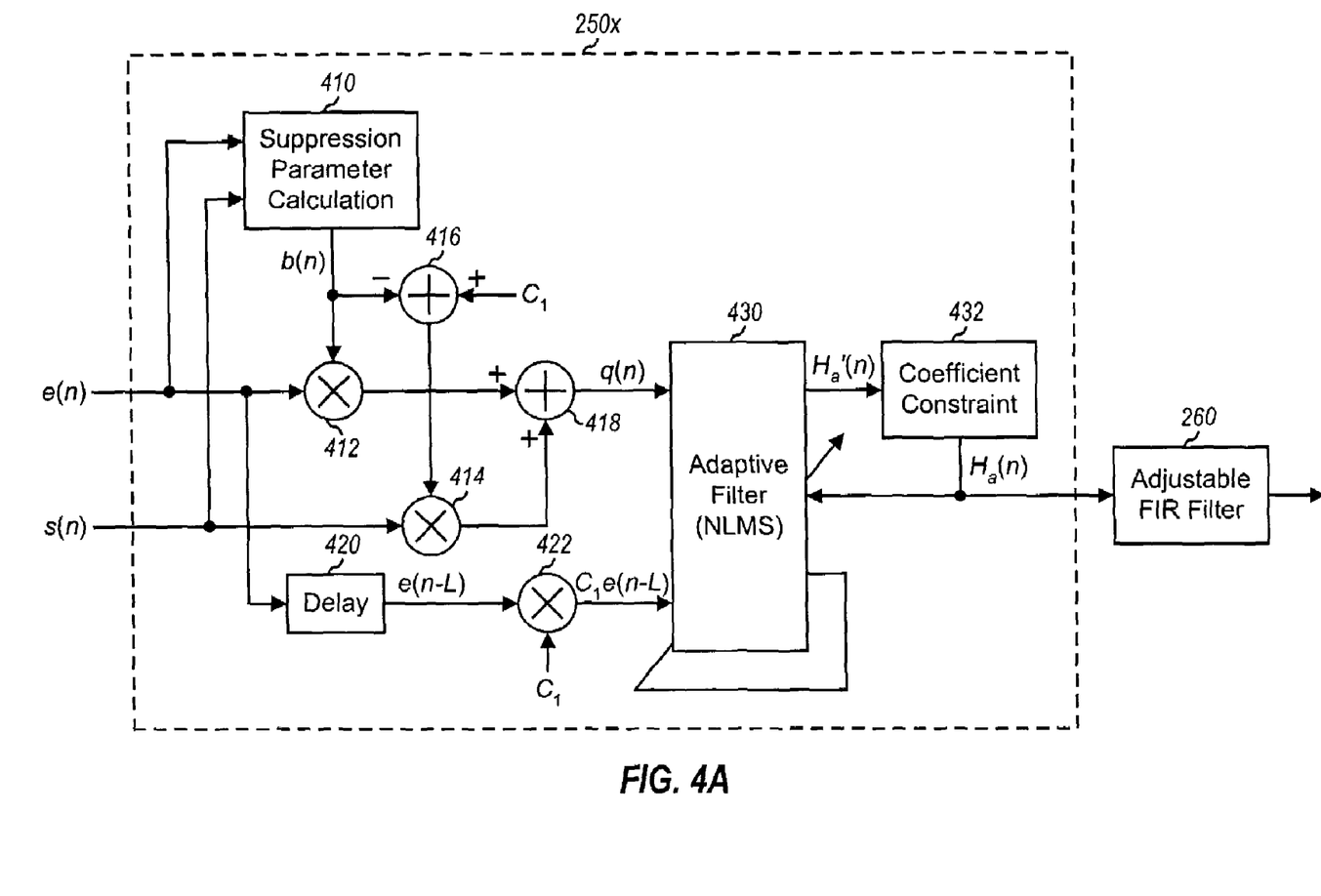
FIG. 4A is a diagram of a post filter.

FIG. 4A is a diagram of a post filter 250x, which is a specific embodiment of post filter 250 in FIG. 2. In this embodiment, within post filter 250x, a suppression parameter calculation unit 410 receives and processes the error signal e(n) and the near-end signal s(n) to provide a suppression parameter b(n). The suppression parameter b(n) is indicative of the amount of cross-correlation between the error signal e(n) and the near-end signal s(n), and may be derived as described below. The suppression parameter b(n) is multiplied with the error signal e(n) by a multiplier 412 to provide the scaled error signal, $b(n) \cdot e(n)$.

The suppression parameter b(n) is also subtracted from a constant $c_1$ (which may be set equal to one, i.e., $c_1 = 1$) by a summer 416 to provide a second parameter, $c_1 - b(n)$. The second parameter $c_1 - b(n)$ is then multiplied with the near-end signal s(n) by a multiplier 414 to provide a scaled near-end signal $(c_1 - b(n)) \cdot s(n)$. The two scaled signals from multipliers 412 and 414 are then summed together by a summer 418 to provide a combined signal q(n). If $c_1 = 1$, then the combined signal q(n) may be expressed as:

$$q(n) = b(n) \cdot e(n) + (1 - b(n)) \cdot s(n). \qquad \text{Eq (3)}$$

The error signal e(n) is also delayed by L samples by a delay element 420 to provide a delayed error signal e(n−L). The delayed error signal e(n−L) is multiplied by the constant $c_1$ by a multiplier 422 to obtain a scaled signal, which is used as a reference signal for an adaptive filter 430.

Adaptive filter 430 receives the combined signal q(n) and the reference signal e(n−L), processes these two signals, and provides a set of coefficients $H_a'(n)$. Adaptive filter 430 may implement the NLMS algorithm or some other adaptive filter algorithm. Adaptive filter 430 attempts to minimize the mean square error between the combined signal q(n) and the reference signal e(n−L), and the coefficients $H_a'(n)$ are updated to minimize this mean square error. Adaptive filter 430 may be implemented using the same design as adaptive filter 230x in FIG. 3. In this case, the reference signal e(n−L) would substitute for the signal r(n) and the combined signal q(n) would substitute for the signal s(n). The coefficients $H_a'(n)$ would then correspond to the coefficients H(n) provided by coefficient update unit 320.

In an embodiment, the coefficients $H_a'(n)$ are provided to a coefficient constraint unit 432, which limits the magnitude of these coefficients to within a particular range of values to provide constrained coefficients $H_a(n)$. Coefficient constraint unit 432 may be used to ensure stability and prevent other deleterious effects.

The coefficients $H_a'(n)$ may be updated by adaptive filter 430 as follows:

$$H_a'(n) = H_a(n-1) + \Delta H_a(n), \qquad \text{Eq (4)}$$

where $H_a(n-1)$ is the constrained coefficient vector provided by coefficient constraint unit 432 for the previous sample period, and $\Delta H_a(n)$ is the amount of adjustment for the constrained coefficients $H_a(n-1)$ to obtain the coefficients $H_a'(n)$ for the current sample period.

The adjustment $\Delta H_a(n)$ may be derived, for example, based on the NLMS algorithm. The constrained coefficients $H_a(n)$ are then derived by coefficient constraint unit 432 based on the coefficients $H_a'(n)$ and are provided as the output from post filter 250x to adjustable FIR filter 260.

Figure 4B:
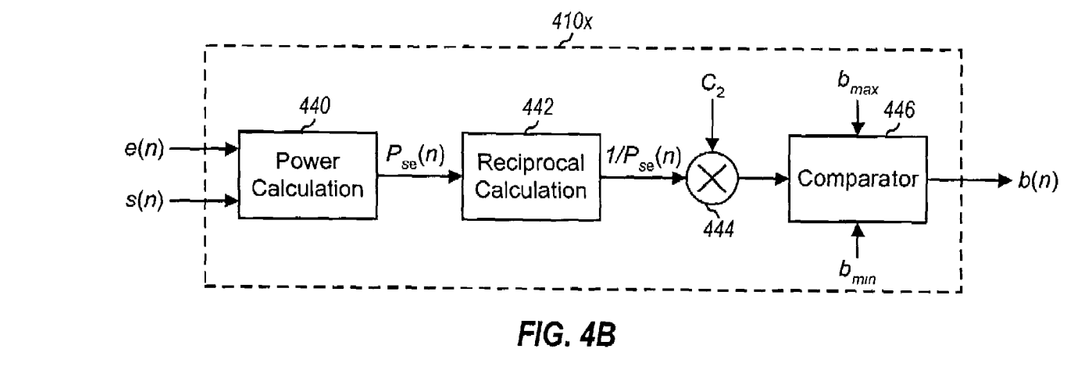
FIGS. 4B and 4C are diagrams of a suppression parameter calculation unit and a coefficient constraint unit, respectively, within the post filter.

FIG. 4B is a diagram of a suppression parameter calculation unit 410x, which is a specific embodiment of suppression parameter calculation unit 410 in FIG. 4A. In an embodiment, suppression parameter calculation unit 410x derives the suppression parameter b(n) based on a cross-correlated power for the error signal e(n) and the near-end signal s(n). The suppression parameter b(n) may also be derived based on other properties of the received signals, and this is within the scope of the invention.

As shown in FIG. 4B, within unit 410x, a power calculation unit 440 receives the error signal e(n) and the near-end signal s(n). Power calculation unit 440 then calculates an average cross-correlated power $P_{se}(n)$, which may be expressed as:

$$P_{se}(n) = \alpha \cdot P_{se}(n-1) + (1-\alpha) \cdot s(n) \cdot e(n), \qquad \text{Eq (5)}$$

where $\alpha$ is a "forgetting" factor for the power computation. As shown in equation (5), the cross-correlated power is first calculated as $s(n) \cdot e(n)$. The cross-correlated power is then exponentially averaged. The factor $\alpha$ is a time constant for the exponential averaging, with a large value for $\alpha$ corresponding to a longer time constant and a small value for $\alpha$ corresponding to a shorter time constant.

The cross-correlated power $P_{se}(n)$ is then provided to a reciprocal calculation unit 442 to obtain a reciprocal of $P_{se}(n)$. If the error signal e(n) and the near-end signal s(n) are correlated, then the cross-correlated power $P_{se}(n)$ is larger, and the reciprocal of $P_{se}(n)$ is smaller. The reciprocal of $P_{se}(n)$ is then multiplied by a multiplier 444 with a positive constant $c_2$, and the resultant product $c_2/P_{se}(n)$ is provided to a comparator 446.

Comparator 446 compares the product $c_2/P_{se}(n)$ with an upper threshold $b_{max}$ and a lower threshold $b_{min}$ to provide the suppression parameter b(n). In particular, the suppression parameter b(n) may be expressed as:

$$b(n) = \begin{cases} b_{max} & \text{if } c_2/P_{se}(n) > b_{max}, \\ c_2/P_{se}(n) & \text{if } b_{max} \geq c_2/P_{se}(n) \geq b_{min}, \text{ and} \\ b_{min} & \text{if } b_{min} > c_2/P_{se}(n). \end{cases} \qquad \text{Eq (6)}$$

By limiting the suppression parameter b(n) to within the range of values defined by $b_{max}$ and $b_{min}$, certain deleterious effects may be avoided.

Figure 4C:
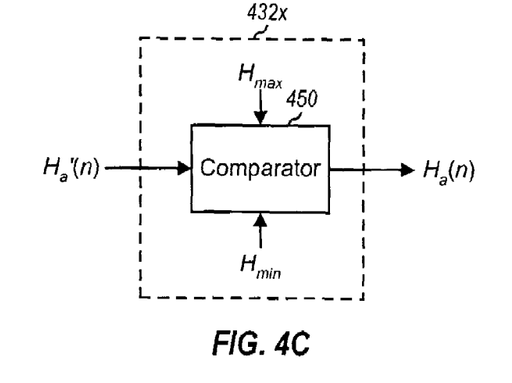

FIG. 4C is a diagram of a coefficient constraint unit 432x, which is a specific embodiment of coefficient constraint unit 432 in FIG. 4A. Within unit 432x, a comparator 450 receives the coefficients $H_a'(n)$ from adaptive filter 430, limits these coefficients to within a particular range of values defined by a maximum value $H_{max}$ and a minimum value $H_{min}$, and provides the constrained coefficients $H_a(n)$. In an embodiment, the comparison is individually performed for each coefficient, and a different set of maximum and minimum values, $H_{max}$ and $H_{max}$, may be used for each coefficient. The comparison of each coefficient $H_a'(n)$ may then be expressed as:

$$H_{a,i}(n) = \begin{cases} H_{max,i} & \text{if } H'_{a,i}(n) > H_{max,i}, \\ H'_{a,i}(n) & \text{if } H_{max,i} \geq H'_{a,i}(n) \geq H_{min,i}, \text{ and} \\ H_{min,i} & \text{if } H_{min,i} > H'_{a,i}(n), \end{cases} \quad \text{Eq (7)}$$

where $H_{max,i}$ and $H_{min,i}$ are the maximum and minimum values, respectively, for the i-th coefficient of the vector $H_a'(n)$.

In another embodiment, the same set of maximum and minimum values $H_{max}$ and $H_{min}$ may be used for all coefficients in the vector $H_a'(n)$. In yet another embodiment, a different set of maximum and minimum values $H_{max}$ and $H_{min}$ may be used for each group of indices.

The constrained coefficients $H_a(n)$ are then used by adaptive filter 430 to update the coefficients $H_a'(n)$, as shown in equation (7). The constrained coefficients $H_a(n)$ are also provided to adjustable FIR filter 260.

As shown in FIG. 4A, post filter 250x receives two input signals (one signal s(n) before and one signal e(n) after adaptive filter 230) and derives the coefficients $H_a(n)$ based on these two input signals. These two input signals are used by suppression parameter calculation unit 410x to estimate the suppression parameter b(n).

Figure 5:
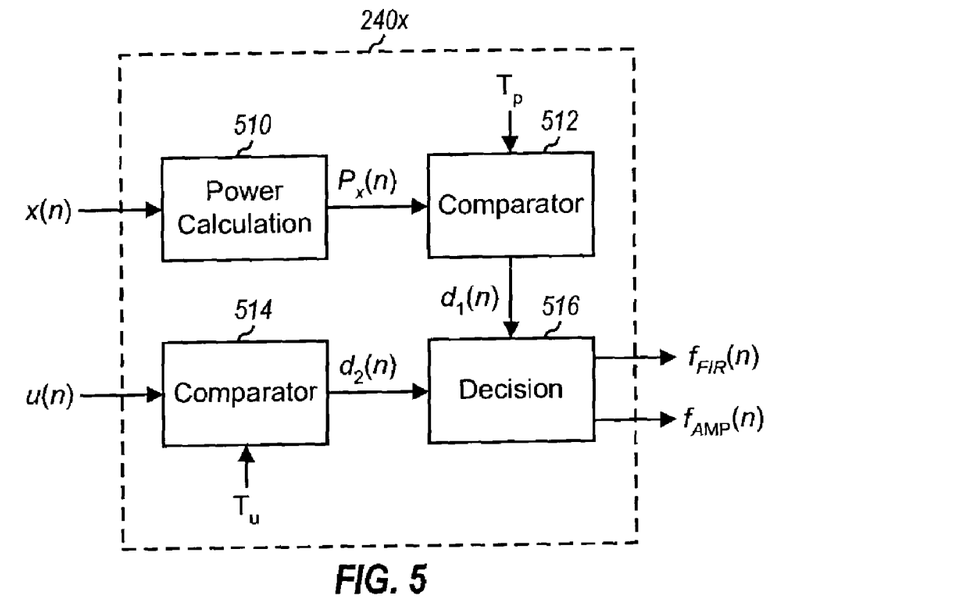
FIG. 5 is a diagram of a channel control unit.

FIG. 5 is a diagram of a channel control unit 240x, which is a specific embodiment of channel control unit 240 in FIG. 2. Channel control unit 240x provides the control signals used to dynamically adjust the echo cancellation such that improved performance may be achieved by echo cancellation system 200. In an embodiment, if the far-end signal is detected, then (1) the gain of amplifier 224 may be reduced, (2) FIR filter 260 may be enabled, and so on. Conversely, if the near-end signal is only present, then (1) the gain of amplifier 224 may be increased, (2) FIR filter 260 may be disabled, and so on.

In the embodiment shown in FIG. 5, channel control unit 240x receives the echo estimate signal x(n) from adaptive filter 230 and the step size signal u(n) from adaptive step size control unit 238, if this control unit is used to control the updating of adaptive filter 230. The amount of echo in the near-end signal s(n) may be estimated based on either of these two signals, or based on both signals.

A power calculation unit 510 computes the power $P_x(n)$ of the echo estimate signal x(n), and may further average the echo power $P_x(n)$. A comparator 512 then compares the (averaged or unaveraged) echo power $P_x(n)$ with an echo power threshold $T_p$ to obtain a first indicator signal $d_1(n)$. The comparison to obtain the indicator signal $d_1(n)$ may be expressed as:

$$d_1(n) = \begin{cases} 1, & \text{if } P_x(n) < T_p, \text{ and} \\ 0, & \text{if } P_x(n) \geq T_p. \end{cases} \quad \text{Eq (8)}$$

A comparator 514 receives the step size signal u(n), if it is available, and compares this signal with a step size threshold $T_u$ to obtain a second indicator signal $d_2(n)$. The comparison to obtain the indicator signal $d_2(n)$ may be expressed as:

$$d_2(n) = \begin{cases} 1, & \text{if } u(n) < T_u, \text{ and} \\ 0, & \text{if } u(n) \geq T_u. \end{cases} \quad \text{Eq (9)}$$

The indicator signals $d_1(n)$ and $d_2(n)$ are provided to a decision unit 516 and evaluated to derive the control signals $f_{FIR}(n)$ and $f_{AMP}(n)$ for adjustable FIR filter 260 and adjustable amplifier 224, respectively. In an embodiment, these control signals may be derived as follows:

$$f_{FIR}(n) = \begin{cases} 1, & \text{if } d_1(n) = 1 \text{ and } d_2(n) = 1, \text{ and} \\ 0, & \text{otherwise,} \end{cases} \quad \text{Eq (10)}$$

and $$f_{AMP}(n) = \begin{cases} 1, & \text{if } d_1(n) = 0 \text{ and } d_2(n) = 0, \text{ and} \\ 0, & \text{otherwise.} \end{cases} \quad \text{Eq (11)}$$

As shown in equations (8) and (9), if the echo power $P_x(n)$ is small (i.e., $P_x(n) < T_p$) and the step size signal is also small (i.e., $u(n) < T_u$), indicating that only the near-end signal is present, then the control signal $f_{FIR}(n)$ is set to logic high. Otherwise, the control signal $f_{FIR}(n)$ is set to logic low. The adjustment of FIR filter 260 based on the control signal $f_{FIR}(n)$ is described below.

As shown in equations (8) and (9), if the echo power $P_x(n)$ is large (i.e., $P_x(n) \geq T_p$) and the step size signal is also large (i.e., $u(n) \geq T_u$), indicating that the far-end signal exists, then the control signal $f_{AMP}(n)$ is set to logic high. A smaller gain ($g(n) = g_1$) may then be used for adjustable amplifier 224. Otherwise, the control signal $f_{AMP}(n)$ is set to logic low, and a larger gain ($g(n) = g_2$, where $g_2 > g_1$) may be used for the adjustable amplifier.

In the above embodiment, the step size signal u(n) is used to derive the indicator signal $d_2(n)$, which is then used to derive the control signals $f_{FIR}(n)$ and $f_{AMP}(n)$, as shown in equations (10) and (11). If adaptive step size control unit 238 is not used to control the updating of adaptive filter 230, then the term $d_2(n)$ may be ignored in equations (10) and (11) and the control signals $f_{FIR}(n)$ and $f_{AMP}(n)$ may be derived based only on the indicator signal $d_1(n)$.

Figure 6:
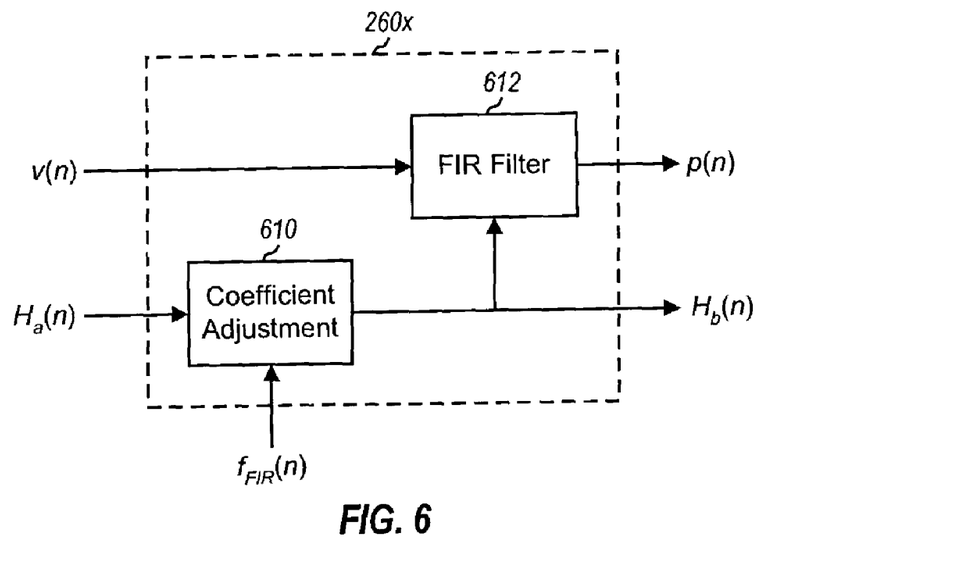
FIG. 6 is a diagram of an adjustable FIR filter.

FIG. 6 is a diagram of an adjustable FIR filter 260x, which is a specific embodiment of adjustable FIR filter 260 in FIG. 2. Within adjustable FIR filter 260x, a coefficient adjustment unit 610 receives and adjusts the vector of coefficients $H_a(n)$ from post filter 250 based on the control signal $f_{FIR}(n)$ received from channel control unit 240. In an embodiment, the adjusted coefficients $H_b(n)$ are derived as follows:

$$H_b(n) = \begin{cases} \delta(n), & \text{if } f_{FIR}(n) = 1, \text{ and} \\ H_a(n), & \text{otherwise,} \end{cases} \quad \text{Eq (12)}$$

where $\delta(n)$ is an impulse vector having the same number of coefficients as the vector $H_a(n)$ and is defined as:

$$\delta(n) = \begin{cases} \delta_m(n) = 1, & \text{for } m = \text{index of the middle coefficient of } H_a(n) \\ \delta_i(n) = 0, & \text{for } i \neq m. \end{cases}$$

A FIR filter 612 receives and filters the signal v(n) from noise estimator 242 with the adjusted coefficients $H_b(n)$ received from coefficient adjustment unit 610 to provide the signal p(n). FIR filter 612 may be implemented with FIR filter 310 in FIG. 3. In this case, the signal v(n) would substitute for the signal r(n), the coefficients $H_b(n)$ would substitute for the coefficients $H_a(n)$, and the signal p(n) would substitute for the signal x(n). If the control signal $f_{FIR}(n)$ is set to logic high ("1"), indicating that only the near-end signal is present, then the adjusted coefficients $H_b(n)$ are set to the impulse vector δ(n) and the FIR filtering is effectively omitted. Otherwise, if the control signal $f_{FIR}(n)$ is set to logic low ("0"), indicating that a large amount of echo is detected, then the adjusted coefficients $H_b(n)$ are set to the coefficients $H_a(n)$ and the filtering is performed based on these coefficients to further suppress echo residue.

Figure 7:
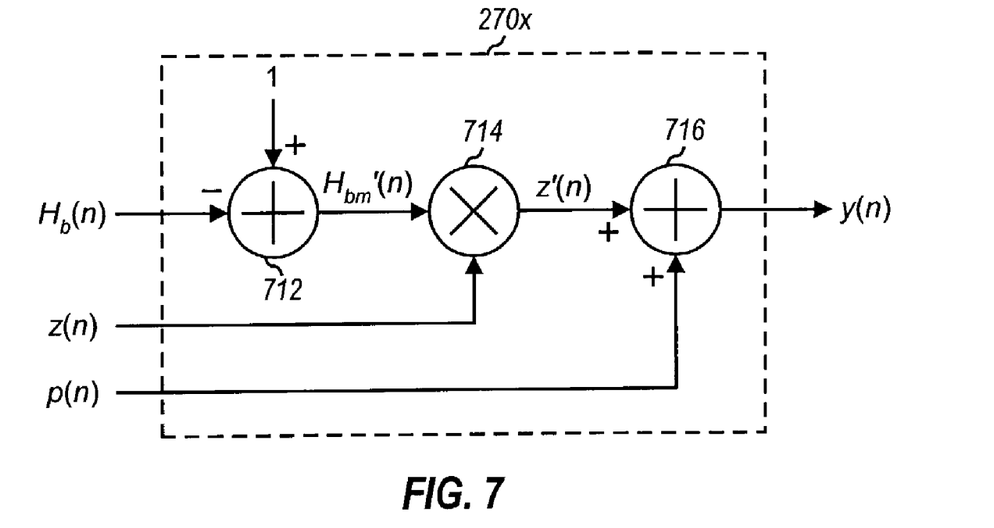
FIG. 7 is a diagram of a noise reinsertion unit.

FIG. 7 is a diagram of a noise reinsertion unit 270x, which is a specific embodiment of noise reinsertion unit 270 in FIG. 2. In this embodiment, the center value $H_{bm}(n)$ of the coefficients $H_b(n)$ are provided to a summer 712 and subtracted from a value of 1 to obtain a scalar $H_{bm}'(n)=(1-H_{bm}(n))$. The scalar $H_{bm}'(n)$ is indicative of the amount of noise to be reinserted back and are determined (indirectly) by channel control unit 240. A multiplier 714 receives and scales the noise estimate signal z(n) received from noise estimator 242 with the scalar $H_{bm}'(n)$ to provide the noise component z'(n) to be inserted back. This entire process of noise reinsertion is also referred to as "noise paste". In an embodiment and as shown in FIG. 2, the noise to be reinserted back is derived from the estimate of the actual noise in the error signal, z(n). The use of the actual noise instead of a pseudo-randomly generated noise may provide improved performance. The noise component z'(n) is then provided to a summer 716 and added to the signal p(n) received from adjustable FIR filter 260 to provide the noise-suppressed signal y(n). The signal y(n) has as much of the remaining echo removed as possible and approximately constant amount of noise.

Figure 8:
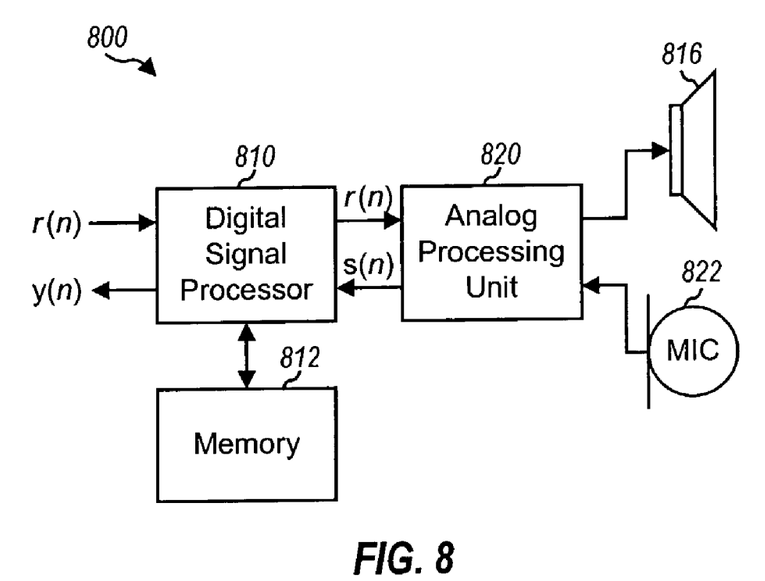
FIG. 8 is a diagram of an implementation of the echo cancellation system.

FIG. 8 is a diagram of an implementation of an echo cancellation system 800. In this implementation, system 800 includes a digital signal processor (DSP) 810, a memory 812, an analog processing unit 820, a speaker 816, and a microphone 822. Digital signal processor 810 may be designed to implement various processing units for echo suppression, such as the processing units shown in FIG. 2. Memory 812 provides storage for program codes and data used by signal processor 810. Analog processing unit 820 performs the analog processing and may include D/A converter 212 and power amplifier 214 in the output path and adjustable amplifier 224 and A/D converter 226 in the input path. Digital signal processor 810 may then implement the remaining processing units of system 200.

The techniques described herein provide improved performance by employing the following mechanisms:

Adjustable gain amplifier 224. If the speaker is too loud, then the echo will likely be strong with respect to the near-end talk. In this case, the gain of amplifier 224 in the input path may be reduced to a lower gain.

Adjustable FIR filter 260. The response of this FIR filter may be adjusted based on step size signal or double-talk detection. Filter 260 may be used to suppress remaining echo that is not suppressed by adaptive filter 230 and pass through the near-end speech without filtering.

Noise reinsertion. The noise level in the output signal y(n) is maintained approximately constant to avoid deleterious effects by subsequent processing units.

The echo suppression techniques described herein may be implemented by various means. For example, these techniques may be implemented in hardware, software, or a combination thereof. For a hardware implementation, the processing units used to implement any one or a combination of the techniques described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the echo suppression techniques may be implemented with modules (e.g., procedures, functions, and so on) that perform the functions described herein. The software codes may be stored in a memory unit (e.g., memory 812 in FIG. 8) and executed by a processor (e.g., digital signal processor 810). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An acoustic echo canceller comprising:
an adaptive filter operative to receive a reference signal and a near-end signal, to cancel a portion of echo in the near-end signal using the reference signal, and to provide an intermediate signal having remaining echo not canceled by the adaptive filter;
a post filter operative to determine cross-correlation between the near-end signal and the intermediate signal, to derive a variable suppression parameter based on the cross-correlation between the near-end signal and the intermediate signal, and to derive a set of time domain coefficients based on the near-end signal, the intermediate signal, and the variable suppression parameter, the set of time domain coefficients being suitable for further suppressing the remaining echo in the intermediate signal; and
an adjustable filter operative to filter the intermediate signal based on the set of time domain coefficients and to provide an output signal having at least a portion of the remaining echo removed.

2. The echo canceller of claim 1, wherein the post filter comprises a second adaptive filter operative to derive the set of time domain coefficients.

3. The echo canceller of claim 1, further comprising:
a noise estimator operative to estimate noise in the intermediate signal; and
a noise reinsertion unit operative to reinsert a version of the estimated noise back into the output signal.

4. The echo canceller of claim 1, further comprising:
a channel control unit operative to provide a control for the adjustable filter, and wherein the filtering by the adjustable filter is modified based on the control.

5. The echo canceller of claim 4, wherein the adjustable filter is operative to filter the intermediate signal based on the set of time domain coefficients from the post filter for a first state of the control and to pass the intermediate signal for a second state of the control.

6. The echo canceller of claim 1, further comprising:
a channel control unit operative to provide a control based on an estimate of the remaining echo; and
an adjustable amplifier operative to receive and amplify an input signal with a gain to provide an amplified signal from which the near-end signal is derived, and wherein the gain is determined based on the control from the channel control unit.

7. The echo canceller of claim 1, wherein the adjustable filter is implemented as a time domain finite impulse response (FIR) filter.

8. The echo canceller of claim 1, wherein the post filter implements a normalized least mean square (NLMS) algorithm.

9. An acoustic echo canceller comprising:
an adaptive filter operative to receive a reference signal and a near-end signal, to cancel a portion of echo in the near-end signal using the reference signal, and to provide an intermediate signal having remaining echo not canceled by the adaptive filter;
a post filter operative to derive a variable suppression parameter based on the near-end signal and the intermediate signal and to derive a set of time domain coefficients based on the near-end signal, the intermediate signal, and the variable suppression parameter, the set of time domain coefficients being suitable for further suppressing the remaining echo in the intermediate signal;
an adjustable filter operative to filter the intermediate signal based on the set of time domain coefficients and to provide an output signal having at least a portion of the remaining echo removed; and
a channel control unit operative to estimate the echo in the near-end signal and to derive a control for the adjustable filter based on the estimated echo in the near-end signal, and wherein the filtering by the adjustable filter is modified based on the control.

10. A method for canceling acoustic echo, comprising:
canceling a portion of echo in a near-end signal using a reference signal to provide an intermediate signal having remaining echo not canceled;
determining cross-correlation between the near-end signal and the intermediate signal;
deriving a variable suppression parameter based on the cross-correlation between the near-end signal and the intermediate signal;
deriving a set of time domain coefficients based on the near-end signal, the intermediate signal, and the variable suppression parameter; and
filtering the intermediate signal based on the set of time domain coefficients to provide an output signal having at least a portion of the remaining echo in the intermediate signal removed.

11. An apparatus, comprising:
means for canceling a portion of echo in a near-end signal using a reference signal to provide an intermediate signal having remaining echo not canceled;
means for determining cross-correlation between the near-end signal and the intermediate signal;
means for deriving a variable suppression parameter based on the cross-correlation between the near-end signal and the intermediate signal;
means for deriving a set of time domain coefficients based on the near-end signal, the intermediate signal, and the variable suppression parameter; and
means for filtering the intermediate signal based on the set of time domain coefficients to provide an output signal having at least a portion of the remaining echo in the intermediate signal removed.

12. An acoustic echo cancellation system comprising:
a channel control unit operative to receive a first signal indicative of echo in a near-end signal, to estimate the echo in the near-end signal based on the first signal, and to derive a control based on the echo estimate; and
an adjustable amplifier operative to receive and amplify an input signal with a gain determined based on the control and to provide an amplified signal from which the first signal is derived, wherein the gain is inversely related to power of the echo estimate.

13. An acoustic echo cancellation system comprising:
a channel control unit operative to receive a first signal indicative of echo in a near-end signal, to estimate the echo in the near-end signal based on the first signal, and to derive a control based on the echo estimate; and
an adjustable amplifier operative to receive and amplify an input signal with a gain determined based on the control and to provide an amplified signal from which the first signal is derived, wherein the gain is set to a first gain value if the echo estimate is large and set to a second gain value if the echo estimate is small.

14. The echo cancellation system of claim 13, wherein the first gain value is smaller than the second gain value.

15. An acoustic echo cancellation system comprising:
a channel control unit operative to receive an input signal indicative of echo in a near-end signal and a step size signal used to generate the input signal, to estimate the echo in the neared signal based on the input signal, and to derive a control based on the echo estimate and the step size signal; and
an adjustable filter operative to receive and process an intermediate signal based in part on the control and to provide an output signal having at least a portion of remaining echo in the intermediate signal removed.

16. The acoustic echo cancellation system of claim 15, further comprising:
an adaptive filter operative to receive the near-end signal, a reference signal, and the step size signal and to derive the input signal and the intermediate signal, and wherein the channel control unit is operative to estimate the echo in the near-end signal based on power of the input signal.

17. A method for canceling acoustic echo, comprising:
receiving an input signal indicative of echo in a near-end signal;
receiving a step size signal used to derive the input signal;
estimating the echo in the near-end signal based on the input signal;
deriving a control based on the echo estimate and the step size signal; and
processing an intermediate signal, based in part on the control, to provide an output signal having at least a portion of remaining echo in the intermediate signal removed.

18. A post filter comprising:
a first unit operative to receive first and second signals and derive a scaling signal based on the first and second signals, wherein the first and second signals are respectively input and output signals for a first adaptive filter used to cancel a portion of echo in the first signal, and wherein the second signal includes remaining echo not canceled by the first adaptive filter;

a summer operative to combine scaled versions of the first and second signals to provide a third signal, wherein the scaled versions of the first and second signals are derived based on the scaling signal from the first unit; and a second adaptive filter operative to receive and, process the third signal and a reference signal to derive a set of time domain coefficients used to remove at least a portion of the remaining echo in the second signal.

19. The post filter of claim 18, wherein the reference signal for the second adaptive filter is a delayed version of the second signal.

20. The post filter of claim 18, wherein a particular amount of remaining echo to be removed from the second signal is determined by the scaling signal.

21. The post filter of claim 18, wherein the scaling signal is derived based on a cross-correlation between the first and second signals.

22. The post filter of claim 18, wherein the first unit is further operative to determine a cross-correlation between the first and second signals, and wherein the scaling signal is derived based on a reciprocal of the cross-correlation.

23. The post filter of claim 18, wherein the second adaptive filter implements a normalized least mean square (NLMS) algorithm.

24. The post filter of claim 18, further comprising:

a second unit operative to constrain the time domain coefficients from the second adaptive filter.

25. The post filter of claim 24, wherein each time domain coefficient of the second adaptive filter is constrained to within a particular range of values defined for that time domain coefficient.

26. A method for canceling acoustic echo, comprising:

processing first and second signals to provide a scaling signal, wherein the first and second signals are respectively input and output signals for a first adaptive filter used to cancel a portion of echo in the first signal, and wherein the second signal includes remaining echo not canceled by the first adaptive filter;

combining scaled versions of the first and second signals to provide a third signal, wherein the scaled versions of the first and second signals are derived based on the scaling signal; and processing the third signal and a reference signal to provide a set of time domain coefficients used to remove at least a portion of the remaining echo in the second signal.

* * * * *